Sept. 17, 1940. F. C. RUPPEL ET AL 2,215,363
RETRACTABLE AUTOMOBILE TOP
Filed Oct. 16, 1939 4 Sheets-Sheet 2

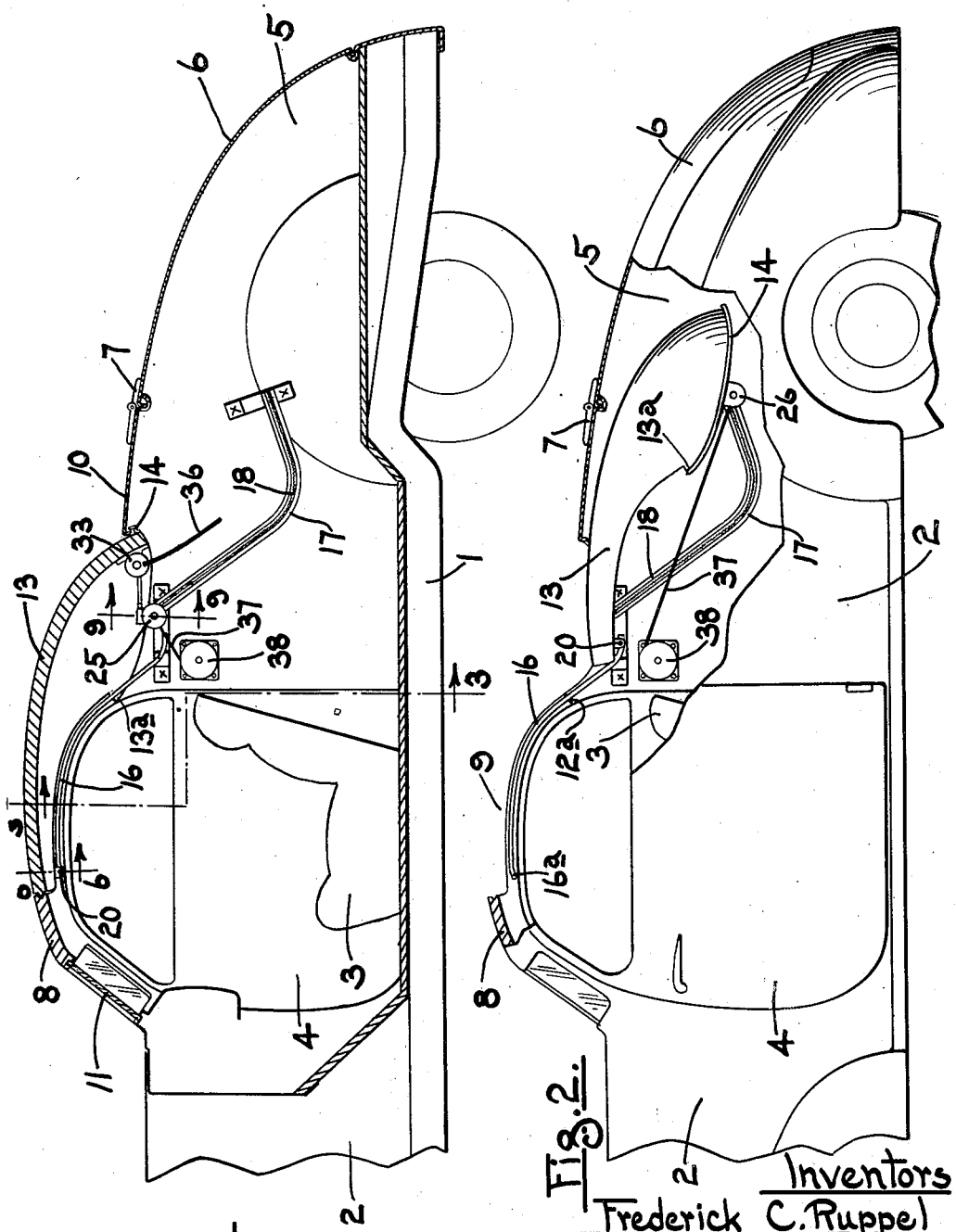

Inventors
Frederick C. Ruppel
Raymond H. Dietrich
By Liserance and Van Antwerp
Attorneys Sept. 17, 1940. F. C. RUPPEL ET AL 2,215,363
RETRACTABLE AUTOMOBILE TOP
Filed Oct. 16, 1939 4 Sheets-Sheet 3
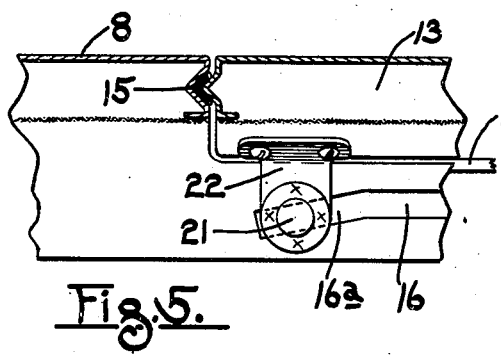
Fig.5.
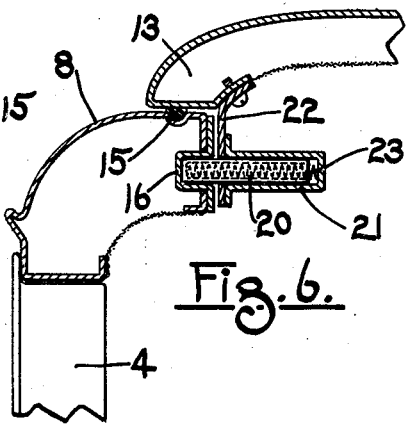
Fig.6.
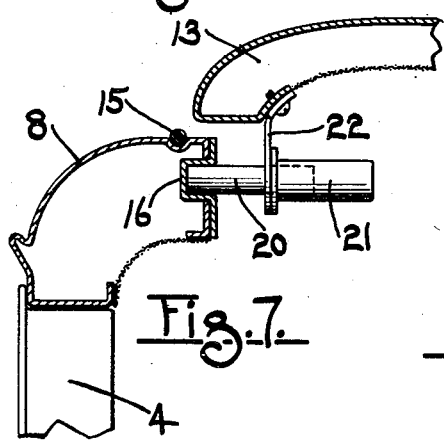
Fig.7.
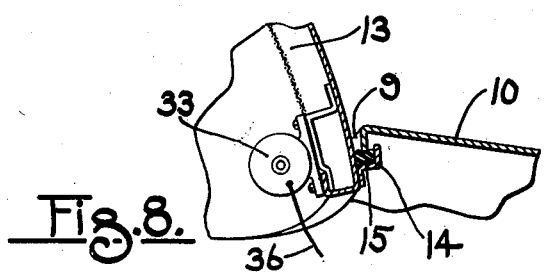
Fig.8.
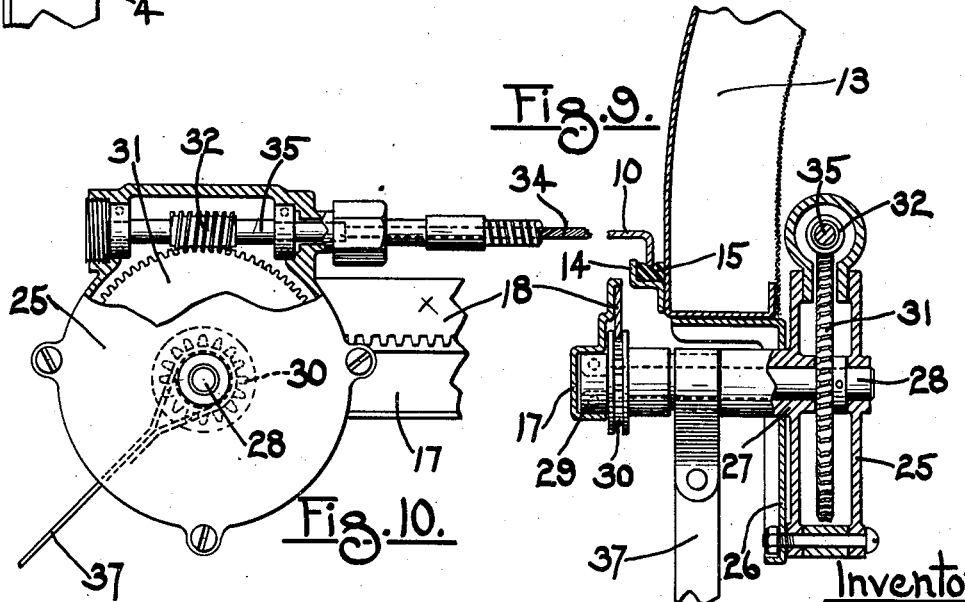
Fig.9.
Fig.10.
Inventors
Frederick C. Ruppel
Raymond H. Dietrich
By Livranie and Van Antwerp
Attorneys

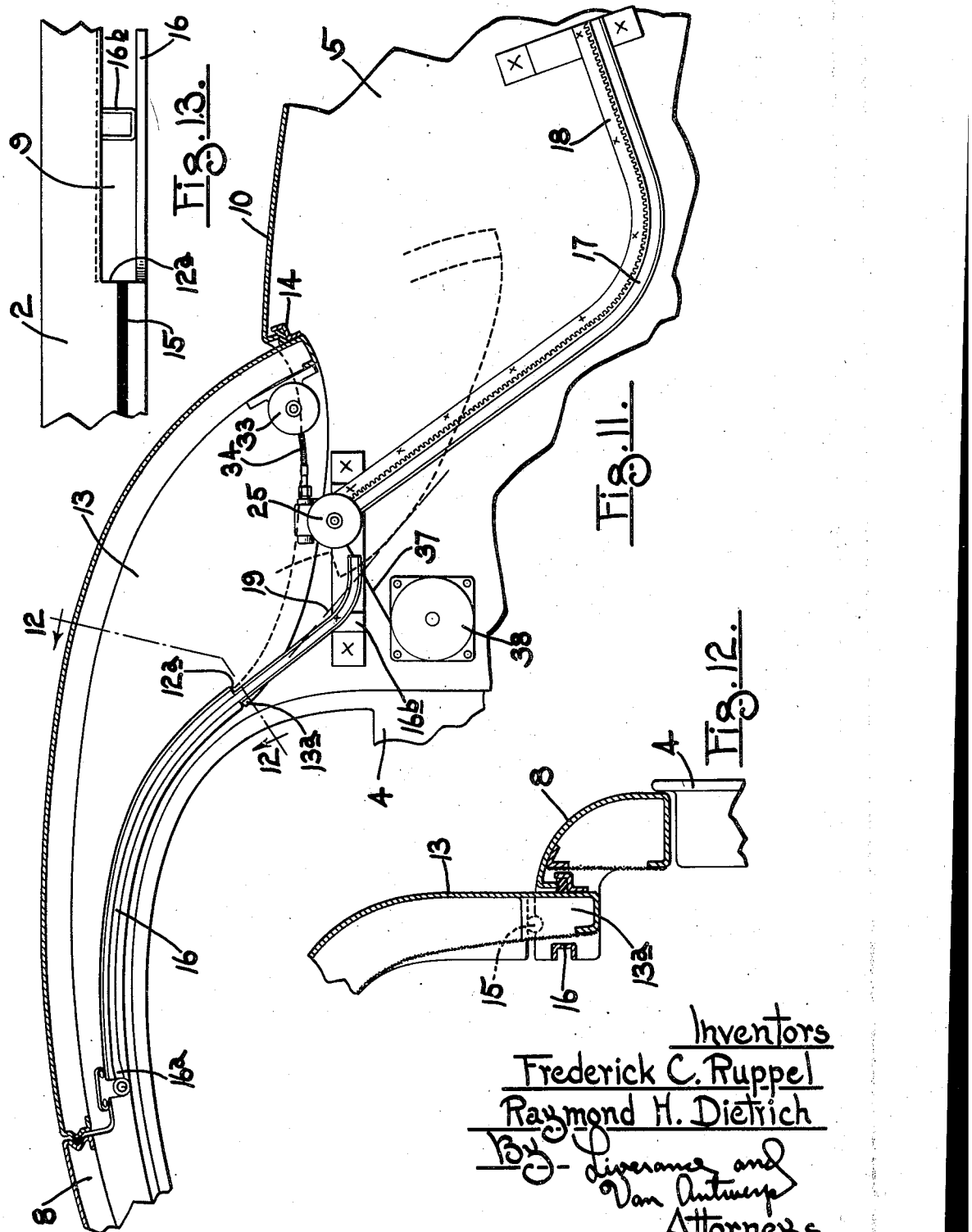

Patented Sept. 17, 1940

2,215,363

UNITED STATES PATENT OFFICE 2,215,363

RETRACTABLE AUTOMOBILE TOP

Frederick C. Ruppel and Raymond H. Dietrich, Grand Rapids, Mich.

Application October 16, 1939, Serial No. 299,679

16 Claims. (Cl. 296—107)

This invention relates to retractable automobile tops. Its purpose is to provide a closed type body with a top having an opening closed by a movable top portion so that in nice weather the occupants of the car may have the advantage of fresh air and unobstructed upward vision and in inclement weather the top may be closed and made weather-tight. This retractable top provides the advantages of the so-called convertible top which has previously been used, but was objectionable for several reasons, among them being that the convertible fabric type top was not durable, it was clumsy and difficult to manipulate and frequently was not weather-tight when closed.

The present top is made of rigid durable material, preferably metal. It is mounted upon guideways so that it can be easily moved from open to closed position, and it is preferably provided with power driven mechanism for moving it to either of its positions. Efficient weather-tight joints are provided which will not leak in bad weather. When closed the top presents an attractive appearance conforming to the design of other parts of the body, and when open it lies concealed in the rear part of the body.

The invention provides various new and useful features of construction and arrangement hereafter more fully described and particularly pointed out in the claims, reference being had to the accompanying drawings, in which:

Fig. 1 is a fragmentary sectional elevation of a body showing the top closed.

Fig. 2 is the same, with the top open.

Fig. 5 is an enlarged fragmentary view on the line 5—5 of Fig. 4 of the forward end of the top in closed position in a section of the body.

Fig. 6 is a fragmentary section of a side portion of the top and part of the body on the line 6—6 of Fig. 1.

Fig. 7 shows the same parts as Fig. 6, with the top moved to partially open position.

Fig. 8 is a fragmentary section on the line 8—8 of Fig. 4 of the lower rear part of the top closed against a fragment of the body.

Fig. 9 is a section of the power driving mechanism on the line 9—9 of Fig. 1.

Fig. 10 is a side view of the part broken away of the power driving mechanism.

Fig. 11 is an enlarged fragmentary section showing the top closed illustrating details of construction and operation.

Fig. 12 is a fragmentary section on the line 12—12 of Fig. 11, and

Fig. 13 is an enlarged fragmentary plan view of a portion of the body at the side of the opening.

Like reference numbers refer to like parts in all the figures.

Figure 3:
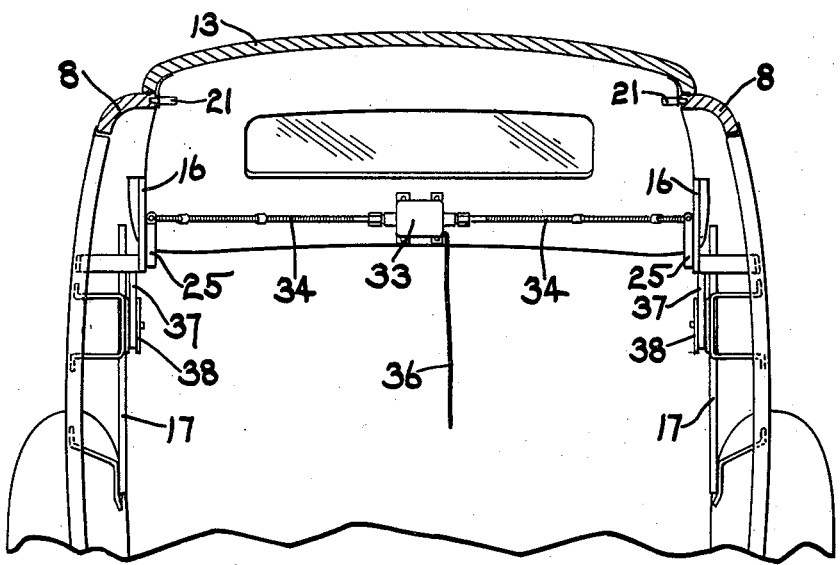
Fig. 3 is a cross section on the line 3—3 of Fig. 1.
Figure 4:
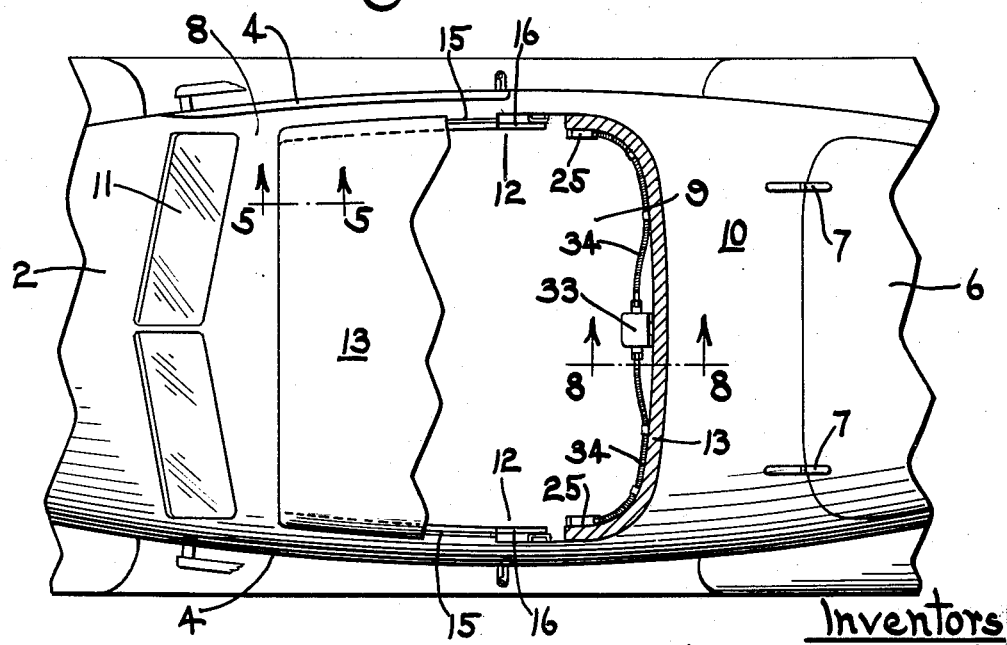
Fig. 4 is a plan view with a part of the top broken away.

1 is the frame of the automobile and 2 represents the body in general which has a seat 3, doors 4 and the usual rear compartment 5 which may be provided as is customary with a door or cover 6, hinged at 7. The upper part of the passenger compartment of the body has a fixed top portion 8 provided with an opening 9 of considerable size extending from near the forward part of the top over the seat 3 and rearwardly terminating in what may be called the rear deck 10. The customary windshield 11 is located in the fixed part of the top and the door openings are also in the fixed part of the top and sides of the body. This opening 9 is preferably narrower crosswise of the body at its forward end, and is widest at a point 12 between its forward and rear ends where it is shaped to provide rearwardly facing shoulders.

The movable top 13 closes the opening 9 when in closed position. In this position the part forward of the widest part of the opening 9 overlaps the fixed part of the body at its sides as shown in Fig. 6, and the part rearward of the widest part 12 of the opening is provided with a channel 14 which extends under the edges of the opening 9. The forward end of the movable top abuts against the fixed portion 8 of the body. Packing strips or gaskets 15 are provided between the adjoining parts of the fixed and movable top members which tightly seal the joints and prevent leakage.

To guide the top in its movement from one position to another, guideways 16 and 17 are provided in the fixed part of the body and are so shaped as to guide the top in its movements so that it will move from its closed position rearwardly and downwardly to a position within the rear compartment 5 where it is substantially concealed. These guides 16 and 17 are provided on each side of the body. The guides 16 are in the nature of channels and extend from a point near the front of the opening 9, following rearwardly close to the edge of the opening and terminate slightly below the opening within the rear compartment 5. The guides 17 are channel shaped and have along one edge throughout their lengths a toothed rack bar 18. These guides 17 extend from a point near the lower rear part of the opening 9 rearwardly and downwardly within the rear compartment 5, and are then curved and extend rearwardly and slightly upwardly.

The shapes of the guideways 16 and 17, as above described, are those which will guide the top of the design shown in the correct manner so that it will pass through the opening 9 and into the rear compartment as desired. It will be understood that the shapes of the guides 16 and 17 will vary with different shapes and proportions of tops and bodies.

Fig. 11 shows details of construction and operation. It will be noted that inasmuch as the part of the movable top forward of the shoulders 12a overlaps the fixed top and the part rearward thereof underlies the fixed portion of the body and has the drip channel 14 around its outer edge that the lower edge of the top 13 must be extended downwardly abruptly at 13a to accommodate these conditions which provide shoulders butting against the shoulders 12a when the top is closed.

In this particular design the guide channel 16 extends into the wider part of the opening to carry the forward part of the top into the compartment 5. When in closed position the lower edge of the top immediately rearward of the projecting part 13a lies between the guide channel 16 and the outer edge of the opening and in moving from one position to another this projected portion 23a escapes the channel 16 and its supporting bracket 16b. This movement is illustrated in Fig. 11 by dotted lines, the dotted line 19 representing the path of that portion of the top most closely approaching the bracket 16b in movement.

The forward part of the top 13 is supported during movement by pins 20 which extend into the channel guides 16. Inasmuch as the width of the opening 9 varies at different locations and the guides 16 follow the edges of the opening, the supporting pins 20 must be mounted so that they will extend outwardly to accommodate wider parts of the opening and will retract to accommodate the narrower dimensions. The pins 20 therefore are mounted in barrels 21 which are attached by brackets 22 to the top 13, and springs 23 are located within the barrels 21 to constantly urge the pins 20 outwardly. By this means the pins will retract into the barrels 21 when they are at the narrower parts of the opening 9 and will extend to follow the guides 16 at the wider parts of the opening.

The rear part of the movable top is carried by a structure which both supports it and is a power means for operating the top. This consists of a pair of housings 25 attached by brackets 26 to the rear portions of the top 13. The housings 25 include bearings 27 in which are mounted shafts 28. Each shaft 28 is provided at its outer end with a roller 29 which traverses the channel of the guide 17 and also with a gear 30 which traverses the rack bar 18, meshing with the teeth therein. The housing also includes a chamber in which is located a worm gear 31 fixed to the shaft 28 and a worm 32 which meshes with the worm gear.

An electric motor 33 is mounted on the rear part of the top 13, preferably near the center thereof, and from each end of its shaft a flexible shaft 34 extends one to each side of the top where they are respectively attached to the shaft 35 which carries the worm 32. Thus the motor 33 simultaneously and synchronously drives the respective shafts 38 causing the sprockets 30 to traverse the racks 18 being guided in their movements by the rollers 29 in the channel guides 17.

The motor 33 may be supplied with electric current, from any suitable source such as a storage battery, by a flexible cable 36 which extends downwardly into the body and follows the movement of the top. The motor 33 is of the reversible type and suitable conventional switches are provided at a point convenient to the occupants of the car to control the circuits over the cable 36 so that the motor may be started and stopped and rotated in either direction to open or close the top as desired. The electric circuits and switches are not illustrated because they may be of conventional form well understood by those skilled in the art.

To aid the motor in lifting the top so that a smaller motor may be used spring actuated straps 37 are connected to the housings 25 and are wrapped around drums 38 which are attached to the body. These drums around which the straps are wrapped are provided with coil springs which tend to turn the drums in a direction to pull on the straps 37 and thus aid in lifting the top to its closed position.

In moving from closed position the forward part of the top moves rearwardly and slightly upwardly because of the upward inclination of the forward end of the channel guide 16 at 16a. This slight upward initial movement separates the top from the gasket 15 along its side edges. The first movement of the rear part of the top is downwardly and rearwardly causing it to separate the packing 15 in the channel 14 from the rear edge of the opening and the rear portion of the top to move downwardly into the compartment 5. In the continued movement of the top the forward part, which is wider than the forward part of the opening 9 and overlaps the fixed part of the top at that location, moves rearwardly with its edges slightly elevated above the fixed part of the top until this portion which is wider than the front part of the opening has been moved backwardly to a point where the opening is wider than that part of the top where it is guided downwardly and rearwardly and passes through the opening to its final position where it is substantially concealed within the compartment 5.

It may be desirable at times to only partially open the top which may be done by stopping the motor 33 when the top is at the desired partially opened position and in that position, as well as in any position to which it is moved, it will be retained by virtue of the irreversible feature of the worm and worm gears 31 and 32. In other words, the worm when rotated will drive the gear 31 but the gear 31 will not rotate the worm 32 and therefore these parts form a lock to hold the top in any position to which it is moved.

While the above described mechanism for actuating the top by means of an electric motor is considered desirable it is conceived that other specific means for power actuation may be substituted and the power need not necessarily be obtained from an electric motor. It is also conceived that the top may be manually moved from one position to another without resorting to power means for operation and such manual operation is practical especially when the spring actuated straps 37 are used to reduce the power necessary for operation.

It will be seen that this invention provides a retractable top which is rigid, durable, easily manipulated from one position to another, weather-tight when closed and concealed when opened. Its operation merely requires pressing a button. It is locked in any position to which it is moved. During movement from one position to another the sealing gaskets are not in contact with a moving part, therefore prolonging their lives, and at the final closing movement the parts are brought into close sealing contact with the gaskets.

The fact that the motor 33 and all of the power actuating parts are mounted on the top 13 and move with it as a single unit is extremely desirable from a manufacturing standpoint. This retractable top unit may be entirely fabricated by itself and then assembled into the body structure as a single unit.

The invention is defined in the appended claims and is to be considered comprehensive of all forms of structure coming within their scope.

We claim:

1. A structure of the class described comprising, an automobile body having a compartment and a top having an opening, said opening having a wider portion communicating with said compartment, a retractable rigid closure for said opening having side edges overlapping a narrower part of said opening and other edges underlying the wider part of said opening, means for guiding the underlying portion of the closure downwardly into said compartment and means for guiding the overlapping portion of said closure downwardly through said wider part of said opening into said compartment.

2. A structure of the class described comprising, a body having a compartment and a top, said top and body having an opening, said opening having a forward narrow portion and a rear wider portion communicating with said compartment, a rigid closure for said opening, said closure having its forward side edges overlapping the top adjacent the edges of the opening and its rear edges underlying the body at a wider portion of the opening, means for guiding said rear underlying portion downwardly into said compartment and means for guiding said forward overlapping portion rearwardly and thence downwardly through the wider portion of said opening into said compartment.

3. The elements defined in claim 2, in which said means for guiding said forward overlapping portion of the top includes means for slightly raising said forward portion at the initial part of the retracting movement.

4. The elements in combination defined in claim 2 in which the forward edge of said closure abuts against the forward edge of said opening.

5. A structure of the class described comprising, an automobile body having a compartment and a top having an opening, said opening having a wider and a narrower portion and said wider portion communicating with said compartment, a retractable rigid closure for said opening having side edges overlapping the narrower part of said opening and means for guiding said closure including said overlapping edges through the wider part of said openings into said compartment.

6. A structure of the class described comprising, an automobile body having a compartment and a top having an opening, said opening having a narrower forward portion and a wider rear portion communicating with said compartment, a retractable rigid closure for said opening, having side edges overlapping the narrower part of said opening, means for guiding the rear part of said closure downwardly through the wider part of said opening into said compartment and means for guiding the forward part of said closure rearwardly and then downwardly through the wider portion of the opening into said compartment.

7. The elements defined in claim 6 in which said means for guiding said forward part of the closure includes means for slightly raising said forward part at the initial part of the retracting movement.

8. A structure of the class described comprising, an automobile body having a compartment and a top having an opening communicating with said compartment, a retractable closure for said opening, means for guiding said closure from a position closing said opening to a position within said compartment and a reversible motor and means driven thereby for moving said closure from one position to another, said motor and driven means being mounted upon and moving with said closure as a single unit.

9. The elements in combination defined in claim 8 in which said power actuating means includes an irreversible worm and gear driving portion whereby said closure will be automatically locked in any position at which the motor driven means is inoperative.

10. The elements in combination defined in claim 8 in which said motor driven means includes synchronously driven power transmitting means at each side of the closure whereby the opposite sides of the closure are moved along their respective guideways at synchronous speed.

11. The elements defined in claim 8 combined with traction means on said body following the contour of one of said guides and with which said motor-driven means cooperates.

12. A structure of the class described comprising an automobile body having a compartment and a top having an opening, a retractable closure for said opening, means at each side of said body for guiding said closure from closed position to a position within said compartment, a reversible motor mounted on said closure, two power transmitting means synchronously driven by said motor mounted on respective sides of said closure for actuating the same and two traction means respectively located at opposite sides of said body and coacting with the said respective power transmitting means.

13. The elements in combination defined in claim 12, in which said traction means lies adjacent to and follows the contour of said guiding means.

14. The elements in combination defined in claim 12, in which said power transmitting means includes a gear driven by a worm acting as a lock when said motor is inoperative.

15. A structure of the class described comprising, an automobile body having a top, said top having an opening of variable width, a retractable closure for said opening, guideways at the respective sides of said opening extending at variable distances from each other corresponding with the variable width of the opening and supporting members mounted at the respective sides of the closure and engaging with said guideways, at least one of said supporting members being extensible laterally so that it may follow its respective guideway during movement of said closure.

16. A structure of the class described comprising, an automobile body having a top and a compartment, said top having an opening communicating with said compartment and said opening having a forward narrower portion and a rearward wider portion, a retractable closure for said opening having its forward portion overlapping the side edges of said opening and its rear portion underlying the edges of said opening, said rear underlying portion being extended beyond the overlapping portion, guideways to guide movement of said closure to dispose it within said compartment, said guideways including forward guideways the rear portions of which extend into said compartment and are spaced from the side edges of the wider portion of said opening, a part of said underlying extension of the closure lying between said rear portion of said guideways and the side edges of said opening.

FREDERICK C. RUPPEL.
RAYMOND H. DIETRICH.